(12) United States Patent
Friedman et al.

(10) Patent No.: US 6,432,522 B1
(45) Date of Patent: Aug. 13, 2002

(54) TRANSPARENT ACOUSTICAL AND MECHANICAL BARRIER

(75) Inventors: Michael Friedman, Wayne, NJ (US); Deirdre C. McDonnell-Lee, Yonkers, NY (US); Marc Rehfeld, Ezanville (FR); Jean-Louis Bravet, Thourotte (FR); Jean-Philippe Boure, Clichy (FR); Volkmar Offermann, Herzogenrath (DE)

(73) Assignees: Saint-Gobain Vitrage, Courbevoie (FR); Saint-Gobain Performance Plastics Corp., Wayne, NJ (US)

( * ) Notice: Subject to any disclaimer, the term of this patent is extended or adjusted under 35 U.S.C. 154(b) by 0 days.

(21) Appl. No.: 09/328,959

(22) Filed: Jun. 9, 1999

Related U.S. Application Data

(60) Provisional application No. 60/120,884, filed on Feb. 20, 1999.

(51) Int. Cl.$^7$ ................................................. B32B 7/02
(52) U.S. Cl. ..................... 428/212; 428/424.6; 428/688
(58) Field of Search ............................. 428/195, 212, 428/424.6, 688

(56) References Cited

U.S. PATENT DOCUMENTS

| | | | |
|---|---|---|---|
| 3,488,715 A | 1/1970 | Atkins | 161/203 |
| 3,666,614 A | 5/1972 | Snedeker et al. | 161/183 |
| 3,711,456 A | 1/1973 | Gilbert et al. | 260/88.1 R |
| 3,762,988 A | 10/1973 | Clock et al. | 161/183 |
| 4,104,216 A | 8/1978 | Clampitt | 260/23 AR |
| 4,309,417 A | 1/1982 | Ohmae et al. | 428/441 |
| 4,382,996 A | 5/1983 | Mori et al. | 428/442 |
| 4,511,627 A | 4/1985 | Tanuma et al. | 428/429 |
| 4,600,627 A | 7/1986 | Honda et al. | 428/203 |
| 4,614,676 A | 9/1986 | Rehfeld | 428/34 |
| 4,614,781 A | 9/1986 | Hori et al. | 525/330.6 |
| 4,663,228 A | 5/1987 | Bolton et al. | 428/334 |
| 4,720,425 A | 1/1988 | Hattori et al. | 428/340 |
| 4,784,916 A | 11/1988 | Bravet et al. | 428/423.1 |
| 4,952,457 A | 8/1990 | Cartier et al. | 428/425.6 |
| 4,952,460 A | 8/1990 | Beckmann et al. | 428/429 |
| 5,183,851 A | 2/1993 | Visani et al. | 525/85 |
| 5,368,917 A | 11/1994 | Rehfeld et al. | 428/215 |
| 5,415,942 A | 5/1995 | Anderson | 428/447 |
| 5,464,659 A | 11/1995 | Melancon et al. | 427/387 |
| 5,476,553 A | 12/1995 | Hanoka et al. | 136/251 |
| 5,478,615 A | 12/1995 | Rehfeld et al. | 428/34 |
| 5,624,763 A | 4/1997 | Melancon et al. | 428/461 |
| 5,625,100 A | 4/1997 | Coolbaugh et al. | 585/12 |
| 5,670,006 A | 9/1997 | Wilfong et al. | 156/236 |
| 5,729,658 A | 3/1998 | Hou et al. | 395/2.79 |
| 5,759,698 A | 6/1998 | Tanuma et al. | 428/442 |
| 5,762,720 A | 6/1998 | Hanoka et al. | 136/251 |
| 5,763,062 A | 6/1998 | Smith et al. | 428/215 |
| 5,773,102 A | 6/1998 | Rehfeld | 428/34 |
| 5,805,457 A | 9/1998 | Sanders | 364/487 |

FOREIGN PATENT DOCUMENTS

| | | | |
|---|---|---|---|
| DE | 197 05 586 C1 | 4/1998 | C03C/27/12 |
| EP | 517 114 A1 | 12/1992 | B32B/17/10 |
| EP | 844 075 A1 | 5/1998 | B32B/17/10 |
| EP | 852 999 A2 | 7/1998 | B32B/17/10 |
| GB | 1386719 | 3/1975 | B29D/7/20 |
| JP | 5138840 A | 6/1993 | B32B/27/30 |
| JP | 7267693 A | 10/1995 | C03C/27/12 |
| JP | 9309938 A | 12/1997 | C08F/285/00 |
| WO | 98/26927 | 6/1998 | B32B/17/10 |
| WO | 98/50228 | 11/1998 | B32B/17/10 |

OTHER PUBLICATIONS

PCT International Search Report, Form PCT/ISA/210, PCT/US00/04074, May 30, 2000, Rijswijk, Netherlands, pp. 1/2, 1/2.

"Surlyn Product Guide", Dupont Technical Service Bulletin; Aug., 1994, pp. 1–8.

"Surlyn 8140 Ionomer Resin" Dupont Technical Service Bulletin; Sep., 1995; pp. 1–2.

Thomas A. Rubbelke, "Scotchdamp Vibration Control Systems", 3M Product Information Performance Data; pp. 1–11, St. Paul, MN.

*Primary Examiner*—Bruce H. Hess
*Assistant Examiner*—B. Shewareged
(74) *Attorney, Agent, or Firm*—Mary E. Porter

(57) ABSTRACT

An optically transparent glazing measures about 3 to 5 mm in total thickness, and has an interlayer film, the interlayer film comprises at least two polymeric film layers: a core film layer having a modulus of at least 25,000 psi (173 MPa) and a surface film layer having a maximum modulus of 15,000 (104 MPa) at 50 to 10,000 Hz and 20° C.; and the glazing is characterized by an acoustical barrier insulating capacity at least equivalent to that of a 3.85 mm thick monolithic pane of glass. The glazing also has an Articulation Index value of less than 64.2% at 50 to 10,000 Hz, a sharpness value of less than 150 at 50 to 10,000 Hz, a penetration resistance of at least 9 meters in test method ECE R43, A6 4.2, and a maximum haze of 4%. The interlayer film has a bending stiffness of at least 0.01 Pa*m$^3$. The surface film layer has a maximum tan delta of 0.6 at 50 to 10,000 Hz and 20° C. The interlayer film preferably comprises one core film layer of between 1.0 and 1.7 mm in thickness within two surface film layers, each between 0.2 and 0.6 mm in thickness. The glazing preferably comprises a glass/interlayer film glass sandwich having a glass/film thickness ratio from 4.2/0.8 to 1.0/2.8.

22 Claims, 3 Drawing Sheets

TRANSPARENT ACOUSTICAL AND MECHANICAL BARRIER

This application claims the benefit of U.S. provisional application No. 60/120,884, filed Feb. 20, 1999. The invention relates to polymeric interlayer films useful in lightweight, impact resistant, transparent glass or plastic laminates. The glass laminates are effective as transparent acoustical and mechanical barriers when used as side lights, back lights and sky roofs in automobiles and other vehicles, as well as in architectural applications.

BACKGROUND OF THE INVENTION

Many polymeric interlayer materials and lamination designs have been described for use in automotive and architectural glazing applications. Industry, government and customer specifications for safety, impact resistance, ultraviolet and infrared light blockage, moisture resistance, haze or optical clarity, sound transmission, weight and thermal transmission direct the selection of materials and designs for particular glazing products. In general, manufacturers require lighter weight, thinner glazing products for automotive assembly than for architectural uses.

Impact resistance and controlled patterns of glass shattering are specified safety parameters for automotive glazing products. To meet these parameters, automotive glazing products are generally constructed of a multi-layer laminate of a glass sandwich containing a polymeric interlayer film. Many automobile-makers require security or anti-theft properties in glazing products in addition to mandatory safety properties. For deterring unauthorized entry into a vehicle, to lessen the likelihood of a person being thrown from a vehicle during an accident and for acceptable security functionality, the glazing products must possess high penetration resistance and high rigidity after glass breakage.

Among the polymeric interlayer materials described as useful in security and safety glass laminations are the high modulus "ionomeric resin" materials used as a film interlayer between two rigid transparent sheets in the manner described in U.S. Pat. No. 4,668,574. In general, an adhesion promoter, e.g., a silane primer, is needed to laminate the ionomeric resin to glass, and the ionomeric resin is preferably cross-linked, e.g., with a diamine, to increase its effective use temperature, to improve glazing clarity and to reduce haze, as described in U.S. Pat. Nos. 4,619,973 and 4,663,228. The mechanical barrier properties of the ionomeric resin laminates are superb. They are used in bulletproof glazing and other very demanding security applications. As described in U.S. Pat. No. 5,763,062, the superior transparency of the ionomeric resins, particularly newer resins having a higher acid content (e.g., at least 17 wt %), or those resins modified with diamine cross-linking, permits use at a relatively large film thickness, on the order of 1–4 mm, in optically transparent laminates.

While useful as security barriers, the ionomeric resin films and laminates made with such films are poor acoustical barriers.

Ethylene vinyl acetate resin film (EVA film) has been used in optical laminates, both as the sole polymeric film and as a component of a multi-laminate interlayer, but it lacks mechanical strength. Many forms of EVA film have use temperature limitations or poor light stability characteristics, making EVA films fairly undesirable components of glazing products. Cross-linking with peroxide improves temperature stability, but may cause light instability, e.g., in solar cells, in the manner described in U.S. Pat. No. 5,478,402. Impact resistance problems in laminated glass made with EVA film are noted in U.S. Pat. No. 5,759,698.

Glass laminates containing a multi-layer film interlayer made with peroxide cross-linked EVA film are reported in U.S. Pat. No. 4,600,627. These EVA films are used at a thickness of about 0.2–0.4 mm, with a core polymer layer of organic resin film at a thickness of about 50 microns, in a glass laminate of at least 6 mm in total thickness. The U.S. Pat. No. 4,600,627 makes no mention of acoustical properties of the multi-layer laminates, and as described in the patent, the multi-layer resin film glazings would be ineffective security barriers.

Polyvinyl butyral resin interlayer film (PVB film) has been an industry standard for many years in automotive glazing products, particularly in windshield glazing. PVB film offers the benefits of transparency and good adhesion to glass. Glass laminates of PVB film have appropriate glass shattering properties and good mechanical strength. PVB resin also is compatible with additives, such as UV light absorbers and plasticizers. However, the need to moisture-seal PVB laminates contributes significant costs to laminates made with PVB film. When used in a sealed laminate, as in windshield constructions, the tendency of the PVB film to absorb moisture is not a problem. For other vehicular glazings, such as side lights (windows in side doors having no perimeter gasket or seal), conventional PVB film absorbs water too readily to permit acceptable use life. More complex and costly moisture resistant PVB resin formulations, such as those described in U.S. Pat. No. 4,952,457, have been developed for unsealed glazing.

When PVB film is used as the sole interlayer film, glazing laminates do not deliver desirable security performance because they have insufficient rigidity after glass breakage due to the low stiffness of the PVB interlayer. An opening can be made too easily between the glazing and the surrounding body of the vehicle. Neither monolithic glass panes, nor PVB film interlayer laminates, provide an adequate security barrier.

Many different types of polyurethane films have been used in automotive glazings. Some polyurethane films are similar to PVB films in their mechanical properties. In WO 98/50228, certain rigid thermoplastic polyurethanes having a Young's modulus of about 2,000 MPa are suggested interlayer films for glazings characterized by a high intrusion resistance. Many have slightly better acoustical barrier attributes than PVB films, but fail to provide an adequate security barrier. Furthermore, as described in U.S. Pat. No. 5,368,917 the polyurethane films tested yielded inadequate acoustical insulating barriers for automotive glazing products.

Acoustical barrier requirements for glazing products are defined in U.S. Pat. No. 5,368,917 for the range of frequencies detectable by the human ear, i.e., about 400–15,000 Hertz, with the most critical range falling between 500 to 10,000 Hertz. The standards in this patent are based on the performance of either a 10 mm or a 5 mm thick monolithic glass pane.

Thus, an acoustical barrier glazing has been traditionally understood to be a barrier providing a level of acoustic comfort within the vehicle or building comparable to the level of acoustic comfort provided by a conventional monolithic glass barrier for a given intensity and quality of environmental noise.

Glass (e.g., soda-lime-silicate mineral glass) provides a good acoustical barrier and, over a critical frequency range of about 800 to 10,000 Hz, is most effective at a total glazing thickness of at least about 10 mm. Effective glass glazing may be monolithic, or it may be a double glass pane construction having an air space between the panes. In automotive glazing products, a maximum thickness of about 5 mm is desired. Automotive side lights have been made with double glass panes separated by an air space to achieve superior acoustical barrier properties, but such a construction is generally unacceptable in automotive glazing due to mechanical barrier (safety and security) considerations.

Thin glass sheets have been laminated with specified "acoustic resins" to make an acoustical barrier laminate at a maximum total thickness of 5 mm. An "acoustic resin" which is a copolymer of 60–98.5 wt % vinyl chloride, 1–10 wt % glycydyl methacrylate and 0.5–10 wt % ethylene blended with 10–40 wt % plasticizer, and a method for measuring sound transmission in glass laminates containing such modified polyvinyl chloride (PVC) resins, are described in U.S. Pat. Nos. 5,773,102 and 5,368,917. Both vehicular and architectural product applications are described. The acoustic resin is laminated between two transparent, rigid sheets made of glass or polymer. The resultant laminate is characterized by acoustical transmission losses which deviate from a 5 mm tempered glass standard by a maximum of 5 decibels in a frequency range from 800 to 2,000 Hz and a maximum of 3 dB at audible frequencies above 2,000 Hz.

The U.S. Pat. No. 5,773,102 discloses a multi-layer film laminate using the modified PVC resin in combination with conventional safety glass laminate resins, such as polyvinyl butyral and polyurethane, and reports no loss of the modified PVC resin acoustical barrier properties in the multi-layer film laminate. The acoustic resin is used in combination with a third, polymer barrier film, such as a polyethyleneterephthalate (PET) film to prevent migration of plasticizer between the acoustic resin film and the conventional (PVB) film. This combination is described as an inexpensive alternative to the use of a monolithic sheet of the acoustic resin in the glass laminate, and as a means to achieve a safety window with a minimum overall thickness and weight, and a minimum quantity of the expensive acoustic resin.

An "acoustic PVB film" for use as a glazing interlayer is described in JP-A-05138840. The film is a multi-layer construction of films made of two PVB resins comprising, respectively, 70–81.8 mole % degree of butyralization and 60–68 mole % degree of butyralization. A plasticizer is used in both films.

A silicone/acrylate resin vibration damping film is disclosed in U.S. Pat. No. 5,624,763. This silicone/acrylate resin ("ISD resin") is suggested for use in applications requiring damping over a wide temperature range (−50 to 200° C.) and is described as having damping performance that is substantially independent of temperature in this range. The use of this ISD resin, in combination with two layers of polyester resin and two layers of PVB resin, as an acoustic damping interlayer film for glass laminates is disclosed in DE-1 97 05 586 C1.

None of these "acoustic resin" films would be effective an security barrier in glazing laminates, and many exhibit undesirable optical properties.

Furthermore, in newer models of automobiles, a glass thickness of 3 to 5 mm has been specified for side lights so as to minimize the contribution of the glazing to the overall weight of the automobile. At the same time automobile manufacturers seek to reduce the weight of the glazing, they also want to maintain the acoustical barrier and security barrier properties of the glazing. The automobile manufacturers increasingly want to respond to consumer demands for a better quality sound environment in the automobile, and to go beyond existing products generally designed to control only the volume of background noise, without regard to whether the type of noise is offensive to humans. Evidence of this trend can be seen in U.S. Pat. No. 5,805,457, the contents of which are hereby incorporated by reference, wherein roughness, dissonance, sharpness and boom measurements are made over frequencies based upon the musical scale interval to predict aesthetic qualities of noise audible to humans in the interior of a vehicle. In particular, a sharpness value is identified as being significant to human perceptions of noise quality. Lower sharpness values are less offensive to the human ear than high values. Other aesthetic factors include Articulation Index values and loudness values over the relevant frequency range. Articulation Index is described in detail in U.S. Pat. No. 5,729,658, which is hereby incorporated by reference. Articulation Index is a measure of the intelligibility of speech and other sounds in the acoustic range and it may be evaluated in a relative manner over multiple listening conditions. For a passenger in a vehicle, exterior speech or noise that is intelligible is more disturbing than non-intelligible speech or noise. The third aesthetic factor, loudness, and methods for its evaluation and measurement across various transmission barriers are described in many patents, including U.S. Pat. No. 5,464,659, the contents of which are hereby incorporated by reference.

We have now discovered an optically transparent multi-layer film made with selected thickness ratios of a low modulus, flexible, resin film, having at least minor acoustic insulating properties, laminated to one or both surfaces of a high modulus, rigid, resin film, having essentially no acoustic insulating properties. This multilayer film offers the desired automotive glazing interlayer combination of a sufficient acoustical barrier to satisfy aesthetic requirements plus a sufficient mechanical barrier needed to make the new, thinner, light weight security glazing. The multilayer film combination satisfies all of the significant automotive glazing specifications for glass laminate thickness, transparency, safety, security, acoustic performance, weight and cost.

The multi-layer film may be constructed from a relatively inexpensive ethylenic acid copolymer resin, such as ethylene vinyl acetate copolymer resin, co-laminated within specified dimensional ratios with a core film made of materials having security and safety attributes, such as an ionomeric resin or polycarbonate, to provide an effective security barrier. The acoustic performance of this particular interlayer film within a glass laminate is at least equivalent to that of a 3.85 mm thick monolithic glass pane.

To provide a security barrier, the core layer is made from materials having a minimum modulus of 25,000 psi (173 MPa) (by ASTM test method D-638) such that penetration resistance and stiffness are adequate. However, such mechanical properties make these materials poor candidates for acoustical barrier applications because high modulus materials normally exhibit small loss factors (tan δ). Furthermore, when these core layer materials are combined with surfaco layer materials having appropriately low modulus values (a maximum of 15,000 psi (104 MPa)) in a multi-layer film, the resultant acoustical barrier appears to function principally by shifting the coincident frequency of the glazing into an aesthetically acceptable spectral range, rather than by merely insulating against the sound transmission. The resultant acoustical barrier properties are unexpected, given the material properties and thickness of the materials employed in the glazing.

When used in glass laminates, this multi-layer film has optical clarity, along with good adhesion to glass, the mechanical properties needed to meet safety and security standards and moisture resistance required for automotive glazing products, including automotive side lights. Optically transparent glazing containing the acoustical barrier, security barrier multi-layer film made according to our invention also may be used in less demanding glazing applications, such as architectural glazing.

SUMMARY OF THE INVENTION

The invention is an optically transparent glazing, measuring about 3 mm to 5 mm in total thickness, and having an interlayer film, the interlayer film comprising at least two polymeric film layers: a core film layer having a modulus of at least 25,000 psi (173 MPa), and a surface film layer having a maximum modulus of 15,000 (104 MPa) at 50 to 10,000 Hz and 20° C.; and the glazing having an acoustical barrier insulating capacity at least equivalent to that of a 3.85 mm thick monolithic pane of glass, an Articulation Index value of less than 64.2% at 50 to 10,000 Hz, a sharpness value of less than 150 at 50 to 10,000 Hz, a penetration resistance of at least 9 meters in test method ECE R43 A6 4.2, and a maximum haze of 4%. The interlayer film has a bending stiffness of at least 0.01 Pa*m$^3$. The interlayer film comprises a surface film layer having a maximum tan delta value of 0.6 at 50 to 10,000 Hz and 20° C. The interlayer film preferably comprises one core film layer of between 1.0 and 1.7 mm in thickness within two surface film layers, each between 0.2 and 0.6 mm in thickness. The glazing preferably comprises a glass/interlayer film glass sandwich having a glass/film thickness ratio from 4.2/0.8 to 1.0/2.8.

DESCRIPTION OF THE PREFERRED EMBODIMENTS

Figure 1:
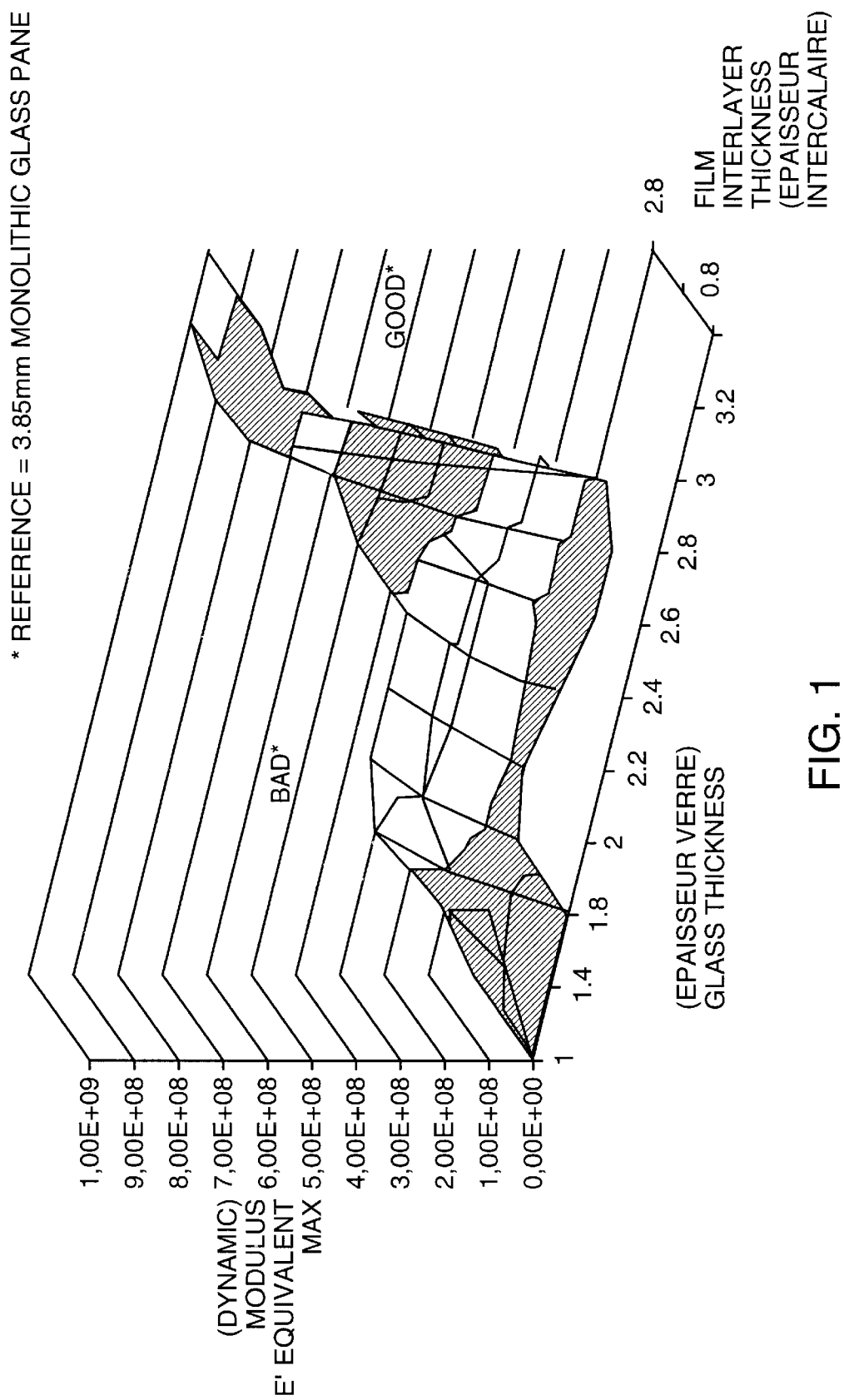
FIG. 1 is a graph illustrating the acoustic properties of a model glass/film glazing at different thickness of film and glass layers and at different Young's Modulus values. The model is described in more detail in Example 4.

As used herein, "glass" means a sheet of rigid transparent material comprising mineral glass or rigid plastic forming the outer faces of a transparent, impact resistant, acoustical barrier glazing. Mineral glass, i.e., soda-lime-silicate glass, gives superior acoustical barrier properties. Mineral glass, polycarbonate, polyacrylate and cyclic polyolefins (e.g., ethylene norbornene and metallocene-catalyzed polystyrene), and combinations thereof, are useful in the outer faces of the glazing of the invention.

"A multi-layer film" or an "interlayer film" is a laminated sheet material of several constructions. In one embodiment, the laminated sheet material comprises at least one rigid core film layer (B) and at least two surface (or soft) film layers (A), has an ABA construction, and is sandwiched between two glass sheets to make a transparent optical laminate having impact resistance and sound barrier properties. An ABC construction having at least two different types of surface film compositions may be used. In an alternative embodiment, the multi-layer film comprises at least one surface film layer and one rigid core film layer in an AB construction. In another alternative embodiment, the multi-layer film comprises at least one soft film layer (A) and at least two rigid core film layers (B) and has an BAB construction.

"A core layer" or "a core film layer' is a layer of penetration resistant, rigid, polymeric material formed by injection molding, film casting, or film/sheet extrusion.

The core layer preferably comprises ionomeric resins, such as copolymers of carboxylic acids or of acrylate esters with ethylene or other reactive co-monomers (e.g., those available from DuPont Nemour, Wilmington, Del. as Surlyn® 8140 or 8920 resin). As used herein, "ionomeric resins" refers to copolymers of acrylate monomers with any reactive co-monomers, including, but not limited to those copolymers disclosed in U.S. Pat. Nos. 5,763,062, 4,663, 228, and 5,763,062, the contents of which are hereby incorporated by reference. The core layer, provided at a thickness of at least 0.8 mm using materials having a modulus of at least 25,000 psi (173 MPa) and present as an interlayer between two 1.1 mm glass sheets, is characterized by sufficient impact resistance to meet automotive security standards. Suitable "security" laminates comprising this core layer have a penetration resistance of at least 9 meters in the ball drop test method ECE R43 A6 4.2. Suitable interlayer films have a bending stiffness of at least 0.01 Pa*m$^3$. When installed as automotive side-lights, the security glazing resists repeated blows (e.g., 5–10) with a heavy object (e.g., a 1–2 kg weight) such that the interior of the automobile is secure against typical accidental or criminal assaults. A security glazing comprising a core layer film at a thickness of at least 0.8 mm (e.g., for cross-linked ionomeric resin) wherein the core layer material has a dynamic modulus of at least 25,000 psi (173 MPa) in the frequency range from 50–10,000 Hz, has sufficient mechanical strength to resist such assaults.

In addition to the DuPont ionomeric resins described above, suitable materials for use in the core layer include resin films of lotek ionomeric resin (copolymers of carboxylic acids obtained from Exxon Corporation), IMAC ionomeric resin (obtained from Chevron Corporation), and polycarbonate, PET, polybutylene terephthalate (PBT), PVC resins, and impact-resistant, rigid thermoplastic polyurethane (e.g., Isoplast™ rigid polyurethane materials (with sufficient minimum modulus) available from Dow Chemical Company) and combinations thereof. The resins may be crosslinked and/or mixed with additives as desired.

The "surface layer" (or "surface film layer" or "adhesive or skin layer" or "soft film layer") may comprise EVA, ethyl acrylic acetate (EM), ethyl methacrylate (EMAC), metallocene-catalyzed polyethylene (m-PE), plasticized PVC, plasticized PVB, ISD resins (U.S. Pat. Nos. 5,624,763 and 5,464,659), polyurethane, acoustic modified PVC (e.g., the acoustic modified PVC of U.S. Pat. No. 4,382,996, available from Sekisui KKKK, Osaka, Japan, and further described in interlayer films of U.S. Pat. No. 5,773,102), and acoustic modified PVB (e.g., JP-A05138840), and combinations thereof. Materials adherent to mineral glass without the application of a primer, such as EVA, are preferred adhesive layers herein because they reduce the cost and complexity of the glazing. Transparent, non-yellowing, temperature and light stable grades of these resins are preferred.

In the "skin" for EVA film/ionomeric film laminates, the EVA film is preferably co-extruded in an A/B/A (EVA/ionomer/EVA) configuration to form a laminated interlayer film. The EVA film alternatively may be extruded separately, or cast into a film, using various film processing techniques, including those extrusion processes described herein for the ionomeric resin film. Suitable EVA resin for optical laminate interlayer films may be obtained, e.g., from Bridgestone Corporation, Tokyo, Japan, Exxon Corporation, Baytown, Tex., and from Specialized Technologies Resources, Inc., Enfield, Conn.

Resin materials suitable for use in either the core layer or the adhesive layer, when tested at a film thickness of about 0.5 up to 2.5 mm, must yield a maximum haze value of 4%, as measured by ASTM D1 003-95. For most automotive, transparent glazing applications, a maximum haze value of 2%, preferably 1%, is required for film at a thickness of 1.4 mm.

For weatherability and environmental considerations, polymeric materials functioning in the temperature range of −60 to 110° C. are used in the core layer and the adhesive layer. For core layer strength at automotive use temperatures, a Tg of at least 40° C. is desired. The best sound damping films are made from polymeric material having a Tg in the range from −40 to 40° C. Published and measured Tg values for preferred resins useful in the multi-layer films are shown in Tables 1 and 2.

To provide a security barrier and an acoustical barrier, the core layer is made from materials having a minimum modulus of 25,000 psi (173 MPa), preferably a minimum modulus of 30,000 psi (207 MPa), as measured by ASTM test D-638. A relatively high storage modulus (G') material with high modulus, high rigidity and high impact resistance are needed for adequate security barrier properties. This leads to the selection of materials having a low loss factor (tan δ). Normally such mechanical properties in a polymeric material make the material a poor candidate for sound damping and acoustical barrier applications. However, it has been discovered that the multi-layer film containing selected ratios of the core layer in combination with a lower stiffness, higher loss modulus (G") adhesive film layer yields an acceptable acoustical barrier in spite of the core layer properties.

Published, and/or measured, modulus values for examples of high clarity, polymeric materials suitable for making the core layer are shown in Table 1.

TABLE I

Modulus of Core Layer Materials-ASTM Method D-638
Core Layer >25,000 psi (>173 MPa)

| Polymer | Tg (° C.) | Modulus psi (MPa) a |
|---|---|---|
| Suryln 8140 ionomer uncross-linked (E. I. Dupont NeMours, Wilmington, DE) | 40–50 | 55–60,000 (379–414) |
| Surlyn 8140 ionomer, cross-linked (E. I. Dupont NeMours, Wilmington, DE) | 40–50 | 70–80,000 (483–552) |
| Surlyn 8920 ionomer, uncross-linked (E. I. Dupont NeMours, Wilmington, DE) | 40–50 | 34–37,000 (235–255) |
| Iotek 8030 ionomer (Exxon Chemical Co, Baytown, TX) | 40–50 | 34–37,000 (235–255) |
| Surlyn 8920 ionomer, cross-linked (E. I. Dupont NeMours, Wilmington, DE) | 40–50 | 37–39,000 (255–304) |
| Polycarbonate (G. E. Company, Pittsfield, MA) | 150 b | 345,000 (2,379) |
| PET (Ticona, Summit, NJ) | 80 c | 400–600,000 (2,759–4,138) |
| PBT(Crastin PBT) (E. I. Dupont NeMours, Wilmington, DE) | 50–55 d | 390–2,000,000 (2,690–13,793) d |
| Rigid PVC (Geon Company, Avon Lake, OH) | 75–100 d | 336,700 (2,322) d | a Modulus values were determined by ASTM D638 method.
b This Tg value is taken from Encyclopedia of Polymer Science and Engineering, ($2^{nd}$ Edition) 1986, Vol. 11, page 657.
c This Tg value is taken from Polymeric Materials Encyclopedia(1st Edition) 1996 page 6078). All Tg values other than those of b. and c. were measured on a DSC 200 Differential Scanning Calorimeter (Seiko Instruments Corp., Japan).
d Data obtained from suppliers of resin materials.

Other core layer materials having a modulus less than 25,000 psi (173 MPa) may be used herein, provided that the resultant interlayer film made with the material has a bending stiffness of at least 0.01 Pa*$m^3$ and the resultant laminate has a penetration resistance of at least 9 meters in test method ECE R43 A6 4.2.

The surface or adhesive film layer(s) of the multi-layer film are made of materials having a maximum elastic modulus of 15,000 psi (104 MPa). The adhesive layer may or may not have sound damping or insulating properties across the frequency range audible to humans. Thus, there may be the surprising result that two films with individually inadequate acoustical barrier properties combine to make a multi-layer film with good acoustical barrier properties.

Published, and/or measured, modulus and Tg values for examples of high clarity, polymeric materials suitable for making the adhesive layer are shown in Table 2.

TABLE 2

Modulus of Adhesive Layer Materials-ASTM Method D638
Adhesive Layers <15,000 psi (<104 MPa)

| Polymer | Tg (° C.) | Modulus psi (MPa) a |
|---|---|---|
| EVA (STR Corp., Enfield, CT) | −20 b | 750–900 (5.2–6.2) b |
| EMA (Exxon Chemical Co., Baytown, TX) | −55 | <4,500 (27.6) b |
| EMAC (Chevron Corp., Orange, TX) | −57 b | <5,000 (34.5) b |
| PVC plasticized (Solutia, St. Louis, MO) | −45 | <1500 (10.3) |
| PVB plasticized (Geon Company, Avon Lake, OH) | 0 | <5000 (34.5) |
| Polyethylene, Metallocene-catalyzed Density <0.9 g/cc (Exxon Chemical Co., Baytown, TX) | −60 b | <11,000 (75.9) b |
| Polyurethane Hard (97 Shore A) | 31 | 400 |
| Semi-rigid (78 Shore A) | −49 | 54 |
| ISD resin d (3M Corp., Minneapolis, MN) | −20 | |

TABLE 2-continued

Modulus of Adhesive Layer Materials-ASTM Method D638
Adhesive Layers <15,000 psi (<104 MPa)

| Polymer | Tg (° C.) | Modulus psi (MPa) a |
|---|---|---|
| Acoustic modified PVB e (Sekisui KKKK, Osaka, Japan) | | 140 | a Modulus values were determined by ASTM D638 method.
b Values were obtained from suppliers' technical data sheets for these product samples.
c All other Tg values were measured on a DSC 200 Differential Scanning Calorimeter (Seiko Instruments Corp., Japan).
d See US-A-5,624,763 for a description of the acrylic/silicone resin materials used in the ISD resins.
e See JP-A-05138840 for a description of the acoustic modified PVB resin.

Other surface layer materials having a modulus in excess of 15,000 psi (104 MPa) may be used herein if the material has a suitable tan delta value. In the past, materials having a tan delta of at least 0.5 were believed essential to creating an acoustic barrier. Rather unexpectedly, preferred surface film materials for the laminated glazing of the invention have a tan delta value in the range from a minimum of 0.1 to a maximum of 0.6, provided the materials control the aesthetic quality of the transmitted sound (i.e., sharpness value, loudness and Articulation Index).

As used herein "tan delta" is a temperature and frequency dependent ratio of the loss modulus to the storage modulus (i.e., G"/G'). In other words, the tan delta is the ratio of the portion of mechanical energy dissipated to the portion of mechanical energy stored (springiness) when a viscoelastic material undergoes cyclic deformation. Optimum damping of sound occurs at the maximum tan delta and more damping occurs when viscoelastic material is constrained in a sandwich than when it is extended or compressed.

The relative thickness ratios of the core layer, the surface layer and the glass panes should be selected so as to optimize the combination of acoustical barrier properties and security barrier properties of the multi-layer film.

The relatively high density of glass makes glass a good acoustical barrier, but weight limitations in vehicles dictate a preferred ratio wherein the glass thickness is minimized. For polymeric materials having a modulus of at least 25,000 psi (173 MPa), a core film thickness of at least 0.8 mm for a cross-linked ionomeric material and at least 1.0 mm for non-cross-linked ionomeric material, in combination with appropriate surface layer films, yields an effective security barrier glazing for automobiles (i.e., a value of at least 9 meters in the penetration resistance test).

The glazing laminate containing this film preferably has a bending stiffness of at least 0.01 Pa*m$^3$, preferably 0.02, and most preferably 0.025. As used herein, "bending stiffness" refers to a calculation of how much an elastic plate (i.e., a glazing laminate) is deformed when a given load is applied. Examples of bending stiffness calculations may be found in various reference texts (e.g., *Theory of Laminated Plates, Progress in Materials Science Series*, Vol. 7, 1970, pages 137–140.

Within these constraints, the thickness of the adhesive film layer needed to give an acoustical barrier equivalent to 3.85 mm thick sheet of glass is at least 0.4 mm for a glazing laminate having a maximum thickness of 4 mm. Thus, the preferred and appropriate thickness ratios herein include glass/film layer ratios between 4.2/0.8 mm and 1.0/2.8 mm. For light weight automotive glazings, a preferred ratio of glass/core layer/adhesive layer is 5.5/3.5/1.0.

The multi-layer film of the invention is constructed from polymeric materials having adequate optical properties of haze, yellow index and UV light transmission for automotive use when co-laminated and assembled into a glazing laminate. Preferred polymeric materials for making these films contain an additive package.

The additive package may include various functional components. The type and content depend on the type and application of the glazing laminate to be produced.

Coupling agents may be added to improve the adhesion of the plastic interlayer to glass and other substrates without primer coating of the substrate. Preferred coupling agents include vinyl-triethoxy-silane, and amino-propyl-triethoxy-silane but other coupling agents can also be incorporated into the formulations.

A UV-light absorber may be added to block the UV-light and to provide protection from the negative influence of the transmission of UV-light. A number of UV-light absorbers known in the industry can be used. Preferred are CHIMASORB TINUVIN 944 UV-light absorber, supplied by CIBA-Geigy Corporation (Switzerland/Germany); CYASORB UV-9 absorber, available from American Cyanamid (Basel, Switzerland), and polymerizable benzotriazole (NORBLOCK®) absorber, supplied by Noramco Corporation (USA). Absorbers should be used in concentrations in the range from about 0.1% to about 1.5%, preferable in the range from about 0.25% to about 1.5%, and most preferable in the range from about 1.0% to about 1.5%.

Nucleation agent may be added to improve optical properties and clarity; to reduce the haze of the film, and to stabilize the morphological structure of the material. Incorporation of a nucleation agent helps to reduce the dimensions of crystallinic units and provides stability after reheating of the film during lamination or after exposure to sun or other sources of heat.

Very small particles of minerals can also be used as nucleation agents. Pigments, dyes, and/or color concentrates may be added when special color effects are needed in the safety glass or plastic laminate for architectural, decorative and other applications. They are used in such concentrations as are determined by coloration technology.

Other additives can also be incorporated to achieve special properties of the interlayer and resultant interlayer film product such as, for example, to achieve reduced IR-light transmittance; to increase reflection, and to decrease the blocking and to improve the slipping of film. A liquid elastomer, such as Isoprene-Butadiene-Isoprene resin available from Mobil Chemical Co., may be added to the ionomeric resin for the purpose of impact modification and as a processing aid.

An interlayer film product according to the present invention may be smooth surfaced or it may also have embossed patterns on its surface which assist the evacuation of air between the glass plates (sheets) and the interlayer during lamination. The film may have embossed patterns on one or both sides made with an embossing roll. Patterns also may be created using an extrusion die with a specific design profile.

Cross-linking of the polymer according to the present invention can be achieved by different techniques. The peroxide technology using organic peroxides (for example dicumyl peroxide) incorporated into the formulation is very efficient. It increases the use temperature up to at least 20°–70° C. Preferred cross-linking materials suitable for use herein include di-cumyl peroxide with an initiator, dibutyltin dilaurate (at 0.025 wt%), available from Aldrich Chemical Co.; 1,3-cyclohexanebis(methylamine)-diamine crosslinking agent, available from Aldrich Chemical Co.; and 2,5 Bis tert-butylperoxy 2,5, dimethyl hexane with an initiator, dibutyltin dilaurate (at 0.01–0.025 wt %), available from Aldrich Chemicals.

Except where otherwise noted, all values reported in the following Examples are at ambient temperatures and all percentages are weight percentages. The Examples are not intended to be limiting, and merely illustrate certain embodiments of the invention.

EXAMPLE 1

This example illustrates the preparation of various comparative interlayer films, and the preparation of the interlayer films and the glass laminates of the invention.

Processing Ionomer Resins into Films

Films based on ionomeric copolymers were produced either from an ionomeric resin alone or from an ionomer resin with one or more additive premixtures. For films containing an additive premixture, the premixture was made using a blend of an unneutralized, polyethylene-methacrylic acid ionomeric resin (Nucrel® resin, obtained from DuPont, Wilmington, Del.) with additives (e.g., liquid elastomer to improve rheological properties and impact resistance at low temperatures and peroxide to cross-link the polymers) as specified in Table 1. All additive formulations were pre-mixed in a dry high speed (turbo) mixer at 300 rpm for 20 min and then fed into a twin-screw extruder ZSK-30 made by Werner Pfleiderer Co. of Ramsey, N.J., equipped with two co-rotating screws with a diameter of 30 mm. Extruder ZSK-30 was equipped with a die plate having six holes. All formulations were extruded into strings. The strings were cooled in a water bath and then cut into pellets of a standard size (2.5–3 mm in diameter and 3-mm in length).

The twin-screw extruder had the following temperatures at the barrel: feeding zone #1, 100–110° C.; barrel zone #2, 110–120° C.; barrel zone #3, 110–120° C.; barrel zone #4, 115–130° C.; die plate, 115–130° C. The speed of the screws was between 70 and 100 rpm. The additives pellets were dried using a room temperature air stream. The temperatures were varied in each zone in a relatively narrow range according to the melt flow rate of the resin used.

In those formulations containing additive premixtures, these additives pellets were combined (at 2 wt %) with ionomeric resin, and, optionally, another additive premixture. The second additive premixture contained the components identified in Table 3. These components were pre-mixed in a dry high speed mixer for 20 minutes and then extruded using a Davis Standard 35 Mark V single screw extruder (9 mm screw diameter) with a 140 mm wide coat hanger die. This single screw extruder had the following barrel temperatures: feeding zone #1—125–135° C., feeding zone #2: 129–139° C., feeding zone #3: 145–155° C., feeding zone #4—148–158° C., and die plate: 153–162° C. The speed of the screw was between 10 and 17 rpm.

Each film was extruded and cooled using a three roll casting roll stock and was wound onto 7.6 cm cores. Fifteen samples were cut for testing from each film produced. At each of five sampling locations which were 10 linear feet (4.05 m) apart, samples were obtained at three points across the film web (from each of the edges and from the middle).

Ionomeric resins used in these films included the 8140 grade and the 8920 grade of Suryin® resin obtained from DuPont Nemours, Wilmington, Del. The EVA resin used in these films was obtained from Specialized Technologies Resources, Inc., Enfield, Conn. under the Photocap™ 15295P designation.

Film Testing Procedures

Film samples produced according to the above description were tested for the parameters listed below in Tables 3–8, as described in the following Tables and Examples. All films listed in Table 3 were extruded at 1.4 mm (56 mil gauge) thickness. Film samples F7, F8, F10, F11 and F13 were co-laminated with EVA film in a 0.2/1.4/0.2 mm thick sandwich configuration. All EVA resin, except the resin used in one of the F11 film samples (used to make laminate sample L19, Table 4), was Photocap™ 15295P EVA resin from STR. The L19 sample was made using a film of SG12514U38 grade EVA resin obtained from Bridgestone Corporation, Yokohama, Japan.

TABLE 3

Film Formulations

| Film Sample | Surlyn Resin Grade | Crosslinking Agent % | Liquid Elastomer % RMR | UV additive % | GC % |
|---|---|---|---|---|---|
| F1 | 8140 | 0 | 0 | 0 | 16 |
| F2 | 8140 | BAC/2 | 0 | 0 | 82 |
| F3 | *8140 | BAC/4 | 0 | 0 | — |
| F4 | 8140 | BAC/2 | **1 | 0 | — |
| F5 | *8140 | DCPR/0.2 | 0 | 0 | — |
| F6 | *8140 | DCPR/0.2 | **1 | 0 | — |
| F7 | 8140 | DCPR/0.2 | **1 | 0.15 | 71 |
| F8 | *8920 | 0 | 0 | 0 | — |
| F9 | *8920 | DCPR/0.2 | 0.5 | 0.15 | — |
| F10 | *8920 | DCPR/0.2 | 0.5 | .019 | — |
| F11 | *8920 | BPDH/0.2 | 0.5 | 0.019 | — |
| F12 | *8920/8140 75/25 wt % | 0 | 0 | 0 | — |
| F13 | *8920/8140 75/25 wt % | BPDH/0.2 | 0.5 | 0.019 | — |

*Samples were extruded on a Davis Standard C&K Phermatic laboratory extruder equipped with a 2 inch (50 mm) screw set at 5–17 rpm and extrusion was done at the same temperature ranges used for the other film samples.
**Premix with Nucrel resin and 0.1% DCPR.

DCPR Recrystalized di-cumyl peroxide with an initiator, DBTDL (dibutyltin dilaurate (0.025%), obtained from Aldrich Chemical Co.

BAC 1,3-Cyclohexanebis(methylamine)-diamine crosslinking agent, obtained from Aldrich Chemical Co.

BPDH 25 Bis tert-butylperoxy 2,5, dimethyl hexane from Aldrich Chemicals and includes an initiator, namely DBTDL (dibutyltin dilaurate (0.01–0.025%).

RMR Isopren-Butadiene-Isoprene liquid elastomer obtained from Mobil Chemical Co.

8920 Surlyn Grade 8920 resin is a partially sodium neutralized copolymer of ethylene methacrylic acid, estimated to contain about 15 wt % acid, obtained from DuPont Nemours, Wilmington, Del.

8140 Surlyn Grade 8140 resin is a partially sodium neutralized copolymer of ethylene methacrylic acid, estimated to contain more than 17 wt % acid, obtained from DuPont Nemours, Wilmington, Del.

Adequate cross-linking to prevent flow of the film at elevated automotive side light use temperatures was achieved in resin samples having a gel content of at least 50% (by Gel Content analysis—ASTM D2765-95; D3351—Test Method for Gel Count of Plastic Film).

The UV light transmission, haze and Yellow Index were measured after laminating a layer of 0.5 to 2.5 mm film between two layers of 1.1 to 3.1 thick sheets of clear, soda-lime-silicate glass as described below. The UV light transmission was measured using ANSI Standard Z26.1T2. The haze was measured using the ASTM D1003-95 Standard. Yellow Index was measured using ASTM E 313-96 Method.

For automotive glazing, 2% or less UV transmission and 2% or less haze are acceptable. For general glazing purposes, 4% or less haze and 4% or less UV transmission are acceptable. As shown below in Table 4, film samples F7 and F9 made with UV additives, and co-laminated film F7 sandwiched between EVA films and used as an interlayer film, made glass laminates suitable for automotive glazing. In general, the 8140 resin exhibited less haze and yellow index percentages in glass laminates than the 8920 resin, but the 8920 resin was acceptable for use herein with appropriate additives and handling. The 8920 resin required crosslinking treatment (F11) to yield acceptable optical properties. UV additives and liquid elastomer can be added to improve film processing and to give optical properties suitable for automotive use (see F12 and F13 film samples).

In treatment levels of >2 wt. % BAC crosslinking agent in the 8140 resin, the BAC caused the Yellow Index of the ionomer to exceed 2%, a percentage which is unacceptable for automotive applications. This result was not observed for the DCPR and BPDH peroxide crosslinking agents at the levels used in these film samples.

EXAMPLE 2

Glass Laminate Preparation

Techniques for sample preparation were selected to mimic industrial manufacturing conditions on a laboratory scale.

Samples of safety glass laminates were prepared using clear soda-lime-silicate glass sheets of 0.118 inches (3 mm) or 0.043 inches (1.1 mm) thickness and dimensions of 4×4 inches (10×10 cm). The glass sheets were cleaned using soapy warm water, alcohol and air drying to remove dust, grease and other contaminates from the glass surface. Film and laminate thickness used varied as described in Tables 1–5.

Pieces of glass sheets and resin films were cut to obtain a sample size of 4×4 inches (10×10 cm) for laminating. The film samples were placed between the two sheets of glass and taped together. For multi-layer film samples, the ionomeric resin sheet was manually aligned with an adhesive or skin film sample of an equal dimension and then placed between two sheets of glass and taped together. The samples were then placed in a nylon bag, sealed and all air was evacuated using a vacuum pump. The following cycle was used to laminate the glass: heating from room temperature to 140° C. over 30 minutes, holding at 140° C. and pressure 5 Bar for 30 minutes, decrease of 70° C. over 10 minutes to normal pressure, and reducing to room temperature and zero pressure over 30 minutes. Heating during the glass lamination process activated the crosslinking agents and the silane additives (present in the EVA films) to increase the softening point, reduce haze properties, and adhere the polymer film to the glass surface.

Properties of laminates prepared in this manner with the film samples of Example 1 are show below in Tables 4 and 5.

TABLE 4

Glass Laminates from films of Table 3

| Laminate | Film (mm) | Haze (%) | Yellow Index % | % UV transmission |
|---|---|---|---|---|
| L1 | F1 | 0.3–0.5 | 0.4 | >35 |
| L2 | F2 | 0.7–0.9 | 1.9 | >35 |
| L3 | F3 | 0.6–0.8 | 4.0 | >35 |
| L4 | F4 | 0.6–0.8 | 1.8 | >35 |
| L5 | F5 | 0.4–0.6 | 0.6 | >35 |
| L6 | F6 | 0.5–0.7 | 0.8 | >35 |
| L7 | F7 | 0.5–0.7 | 1.52 | 0.04 |
| L8 | F8 | 0.5–0.7 | 1.25 | >35 |
| L9 | F9 | 1.0–1.2 | 1.94 | 0.02 |
| L10 | F10 | 1.0–1.2 | 1.83 | 14 |
| L11 | F11 | 0.6–0.8 | 1.27 | 13.7 |
| L12 | F12 | 3.3 | 8–9 | >35 |
| L13 | F13 | 1.2 | 2.96 | 12.9 |
| L14 | co-laminate EVA/F7/EVA | 1–1.2 | 1.2 | 0.01 |
| L15 | co-laminate EVA/F8/EVA | 1.9–2.2 | 3.1 | 10.2 |
| L16 | co-laminate EVA/F 10/EVA | 4.2–4.4 | 4.5 | 3.0 |
| L17 | co-laminate EVA/F 11/EVA | 1.8–2.0 | 1.73 | 5.6 |
| L18 | co-laminate EVA/F1 3/EVA | 2.5–2.7 | 2.1 | 4.2 |
| L19 | co-laminate EVA/F 11/EVA | 1.5–1.7 | 3.0 | 0.16 |

Adequate adhesion of the ionomer resin film to the glass sheets was achieved in ionomeric resin samples L20a to L24 and control 2 only by utilizing a primer on the surface of the glass. For the co-laminated EVA and ionomer resin film samples L25 and L26, adequate adhesion could be achieved without the use of a primer.

The security barrier impact and penetration resistance properties of interlayer film samples laminated between glass panes were tested and compared to those of various materials used commercially in vehicular sidelights (i.e., comparative samples LC1/FC1 of PVB film and LC2/FC2 of Noviflex ionomer resin film). In preparing laminates for these tests, the sample size was 12×12 inches (30×30 cm) and the glass thickness was 2.8 inches (1.1 mm). For every impact test carried out using the ionomeric films without an EVA film skin (i.e., not colaminated), a primer was used on the glass. Adequate adhesion (pummel value of 6–8) had to be achieved before testing the penetration of the material with the ball drop test. Results are shown in Table 5 for the glass laminate samples.

Based on the impact values reported in Table 5, the acid content of the resin and type of cross-linking agent used in cross-linked samples did not significantly affect the ionomeric resin as an impact or security barrier, provided the ionomeric resin was employed at a sufficient thickness. For the vehicular sidelight products of the invention, the core layer of ionomeric resin is preferably at least 1.0 mm in thickness if crosslinked with a minimum of either 0.1 wt % DCPR or 2.0 wt % BAC, and at least 2.0 mm in thickness if not crosslinked, to achieve a value of at least 9 m in the impact test.

TABLE 5

| Laminate/Film Sample | Film Resin | Primer | Pummel Value[a] | Thickness Glass/Interlayer/Glass (mm) | Impact Test limiting drop height (m) w/ 226 g ball[b] |
|---|---|---|---|---|---|
| LC1/FC1 | PVB film[c] | No | 4–8 | 1.6/0.76/1.6 | 6 |
| L20a/F1 Extruded 1 mm | 8140 ionomeric resin | Yes | 6–8 | 1.1/1/1.1 | 5 |
| L20b/F1 | 8140 ionomeric resin | Yes | 6–8 | 1.1/2 × 1/1.1 | 10 |
| L21/F4 Extruded 1 mm | 8140 ionomeric resin/ X-link + elastomer | Yes | 6–8 | 1.1/1/1.1 | 10 |
| L22/F4 | 8140 ionomeric resin/ X-link + elastomer | Yes | 6–8 | 1.1/2 × 1/1.1 | >13.5 |
| LC2/FC2 | Noviflex ® ionomeric Resin film[d] | Yes | 6–8 | 1.1/2/1.1 | >13.5 |
| L23/F7 | 8140 ionomeric resin/ X-link + elastomer | Yes | 6–8 | 1.1/1.4/1.1 | 8 |
| L24/F7 | 8140 ionomeric resin/ X-link + elastomer | Yes | 6–8 | 1.1/2 × 1/1.1 | 8 |
| L25/F7 Extruded 1 mm | *EVA/8140 resin/EVA[e] | No | 6–8 | 1.1/0.2-1-0.2/1.1 | 12 |
| L26/F7 | *EVA/8140 resin/EVA[e] | No | 6–8 | 1.1/0.2-1.4-0.2/1.1 | >13.5 |

[a]Pummel value was determined by cooling laminated samples to −20° C. for 24 hrs, removing the samples from the cooling chamber, immediately striking them with a flat-headed hammer until the glass has been shattered, and then visually evaluating the amount of glass remaining adhered to the polymeric interlayer film. A pummel value of 0–1 was assigned to samples having essentially no remaining glass adhered to the polymer, a value of 4–6 was assigned to samples having about 50% of the glass remaining; and a value of 10 was assigned to samples having essentially all of the glass remaining. Values in between these values were extrapolated based on the relative percentage of glass remaining adhered to the polymeric material.
[b]Impact resistance was determined by the ECE R43 A6 4.2 test method.
[c]PVB film was obtained from Solutia Company, St. Louis, MO.
[d]Noviflex film was obtained from Sully North America, Trumbauersville, PA.
[e]EVA film was obtained from STR, Inc., Enfield, CT.

The results set forth in Table 5 indicate the PVB resin film laminated glazing (comparative, prior art, interlayer film) has an impact resistance of 6 m in the ball drop test. In this test, the "limiting drop height" is the height at which penetration occurs. As the thickness of film increases, the limiting drop height increases as shown by samples L20a and L20b. Cross-linking of the material also increases the impact performance of the material as can be seen in the difference between the limiting drop heights attained in L20a & b and L21 and L22.

The combined diamine/peroxide cross-linking agents provided better impact results than the peroxide agent as seen from the Table 5 data for samples L22 and L24. This may result from the more efficient cross-linking capacity of the diamine/peroxide cross-linking agents (note the gel content of 82% in Table 3) relative to the peroxide system (a gel content of 71% in Table 3).

Combining the EVA film with the ionomeric film improves the impact strength, increasing the limiting drop height. A comparison of samples L23 and L26 shows an increase of >5.5 m with the addition of the two EVA layers (each 0.2 mm in thickness). In contrast, the increase of F1 film thickness from L20a to L20b demonstrated an increase of only 5 m in the limiting drop height with an additional 1.0 mm in film thickness. The surprising results with the EVA skin may be due to the combination of a lower modulus material with a higher modulus material, wherein the low modulus EVA absorbs and dissipates some of the impact energy of the ball, and the high modulus ionomeric core provides mechanical strength to resist penetration.

EXAMPLE 3

The compositions listed below in Table 6 were tested for viscoelastic properties on a Dynamic Mechanical Thermal analyzer (DMTA) (Viscoanalyseur VA 815+, obtained from Metravib Company) at 5 to 400 Hz and −10 to 90° C. (extrapolated to frequencies of 50 to 10,000 Hz), and the results (dynamic or storage modulus (G' at 20° C. and 200 Hz), tan δ (G"/G') and TMA) are shown in Table 6. Film samples from Example 1 were prepared for testing by laminating five (1 mm thick) sheets of the film between two release sheets within two sheets of glass using the lamination and autoclave process described in Example 2, above. The DMTA testing was carried out on the single sheet of laminated film 5 mm in thickness after removing the film from the glass and release sheets.

TABLE 6

| Film sample[b] | G'(MPa) | tan delta | TMA (° C.) |
|---|---|---|---|
| Noviflex resin film | 167 | 0.070 | 98 |
| F1 (5 mm) | 320 | 0.049 | 103 |
| F-4 (5 mm) | 309 | 0.052 | 118 |
| F-4 (5 mm) | 287 | 0.050 | |
| F-4 (5 mm) | 252 | 0.067 | |
| F-4 (5 mm) | 253 | 0.065 | |
| F-4 (5 mm) | 254 | | |
| F-7 (5 mm) | 273 | 0.059 | 98 |
| F-7 (5 mm) | 277 | 0.059 | |
| EVA (peroxide cross-linked, STR grade) | 41 | 0.19 | 107 |
| | 47 | 0.16 | |
| ionomeric resin (DuPont Sentry Glass Plus ®) | 267 | 0.054 | 105 |
| PVB[c] | 140 | 0.30 | |
| PVB acoustic[d] | 0.7 | 0.90 | |
| 3.85 mm glass | 24,000 | 0.03 | |
| ISD resin[a] | 0.9 | 0.7–0.9 | |

[a]The tan delta value was reported in US-A-5,624,763 for the ISD resin.
[b]Noviflex resin was obtained from Sully North America, Trumbauersville, PA; Sentry Glass Plus was obtained from DuPont, Wilmington, DE; and PVB resin (3 G grade) was obtained from Solutia, St. Louis MO. Other film samples are described in Table 3, above.
[c]PVB material (IIIG grade resin) was obtained from Solutia, St. Louis, MO.
[e]PVB acoustic film was obtained from Sekisui KKKK, Osaka, Japan.

It can be seen from these results that the ionomeric resin film interlayers used commercially for security glazing laminates (e.g., Noviflex resin film and Sentry Glass Plus ionomeric resin) are not acceptable for use in an acoustical barrier glazing laminate. In general, the insulating capacity of the higher modulus polymeric films tested was less than that of a 3.85 mm monolithic glass pane and the insulating capacity of the lower modulus polymeric films was more than glass. However, as demonstrated in Example 4, the films of the invention comprising a colamination of a high modulus film and a low modulus film exhibited aesthetically acceptable acoustic performance in a vehicle noise model.

EXAMPLE 4

Figure 2:
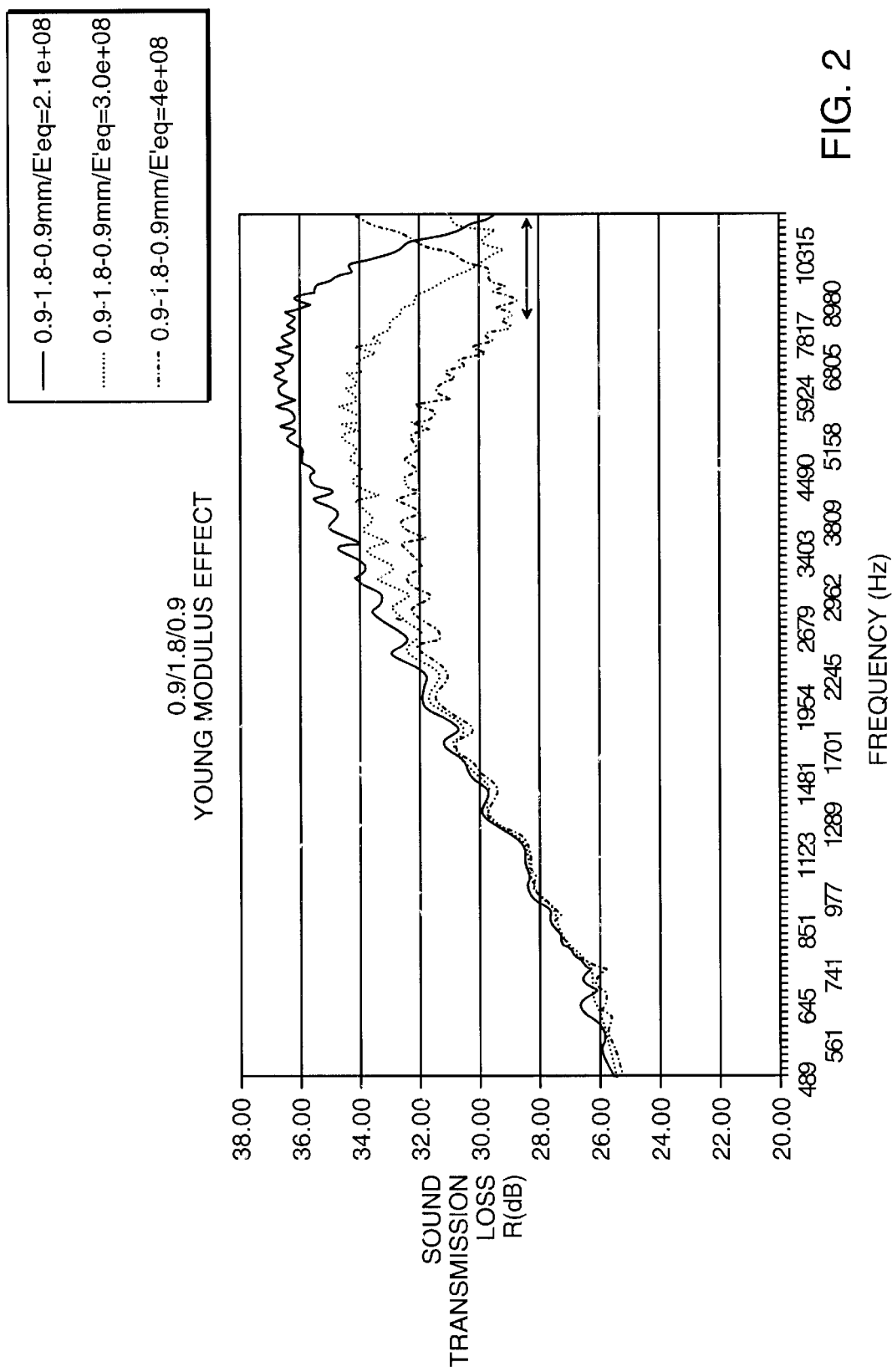
FIG. 2 is a graph illustrating the relationship between the equivalent Young Modulus for a given mass of the multi-layer film and the Sound Transmission Loss (ratio of incident sound energy to transmitted sound energy in dB/Hz) for the test glazing laminates. Differences in Sound Transmission Loss occur only in the coincidence frequency range corresponding to dips in the curves. Curve areas having the dips are linked to laminate stiffness and mass, but the remainder of the curve area is only linked to laminate mass.
Figure 3:
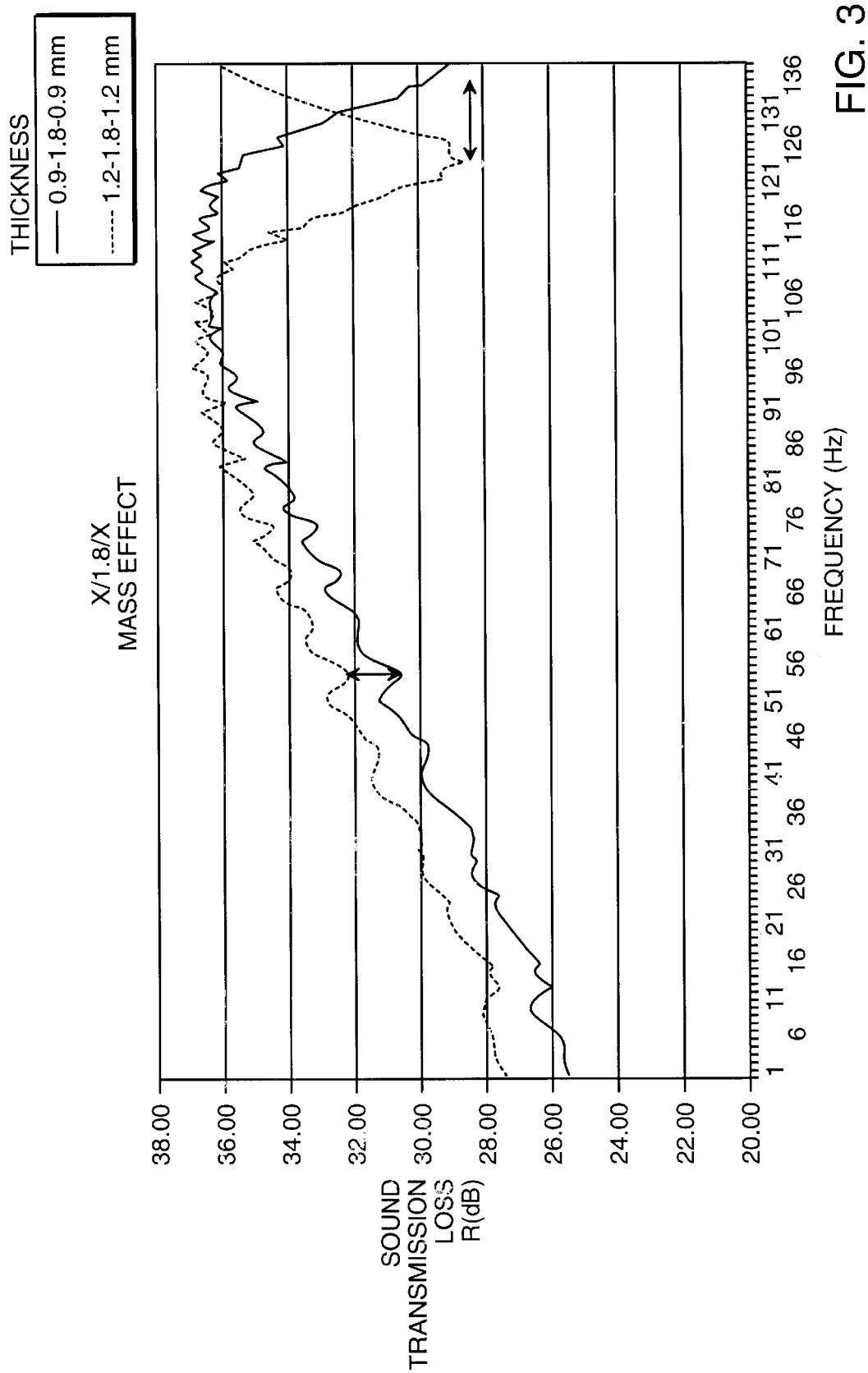
FIG. 3 is a graph illustrating the relationship between mass effect (thickness) and the sound Transmission Loss for the test glazing laminates. Because mass changes, laminate stiffness also changes. In curve areas controlled by mass law, curves are parallel, but for higher frequencies, coincident effects are observed.

By way of example of acoustic insulating calculations from polymer modulus data, FIGS. 1–3 graphically illustrate a calculation for a glazing containing a material, such as an EVA, having a tan delta value of about 0.2. In the graph of FIG. 1, one axis is the Young's modulus of the material, another axis is the glass thickness in mm, and a third axis is the film interlayer thickness in mm. The area below the curve in FIG. 1 represents combinations of glass and film having acceptable acoustic insulating properties relative to a 3.85 mm monolithic glass pane. The area above the curve in FIG. 1 represents combinations having bad acoustic insulating properties relative to this glass standard. FIG. 2 illustrates the relationship between Young's modulus and the Sound Transmission Loss (ratio of incident sound energy to transmitted sound energy in dB/Hz) for the test glazing pane comprising the film at a constant internal loss level. FIG. 3 illustrates the relationship between mass effect (thickness) and the Sound Transmission Loss for the test glazing pane at a constant internal loss level. Such calculations are useful in predicting suitable acoustical barrier materials for insulating against sound, but they do not take into account the aesthetic character of the acoustic transmission, a variable that has become important to acceptance of a glazing for vehicular use.

Calculations of the aesthetic qualities (sharpness, loudness and Articulation Index %) of acoustic performance in vehicular sidelights were made using a database of known acoustical performance values for a 3.85 mm glass pane, and the G' and tan delta values of the multi-layer film of the invention and various comparative materials. Calculations assumed the film thickness recited in Tables 7 and 8, below. Calculations were done with a model developed on a Binaural Analysis System (BAS) signal processing system (obtained from Head Acoustics GmbH, Herzogenrath, Germany) and were derived from experimental data obtained for a Peugeot 605 vehicle in an anechoic wind tunnel at 140 km/h with 0° incident angle of wind over 100 to 5,000 Hz (made with the Artificial Head of Head Acoustics). Calculations simulate the replacement of one glazing for another glazing in the vehicle under these experimental conditions. The background noise was subtracted from the noise measured within the vehicle through a first glazing type; a transfer filter from one glazing to another was applied to the resultant noise spectrum; the background noise was added back in; and the internal noise spectrum attributable to the second (test) glazing was obtained.

The internal noise spectrum is expressed with the three parameters shown in Tables 7 and 8. Criteria used for these values were: loudness, ISO 532 B, option FFT/ISO 532; sharpness, option FFT/ISO 532; and Articulation Index, AI calculation method. These criteria are described in *BAS 4.4 Binaural Analysis System Manual* August 1997, Edited by Head Acoustics GmbH, Rev. 5; Part 2, Chapter 4, 4–28 & 4–70.

The results for the glazings of the invention shown in Table 7 assume the presence of two outer glass sheets, each 1.1 mm thick, in combination with the interlayer film. The film is a combination of ionomeric resin film (F7) within a sandwich of two EVA films, at the selected film thickness shown in Table 7.

TABLE 7

| EVA[a] (mm) | Core layer[b] (mm) | EVA[a] (mm) | Total Glazing (mm) | Loudness (sones) | Sharpness | Articulation Index % |
|---|---|---|---|---|---|---|
| 0.1 | 1.8 | 0.1 | 4.2 | 23.2 | 155 | 66.9 |
| 0.2 | 1.8 | 0.2 | 4.4 | 22.7 | 149 | 69.7 |
| 0.2 | 1.4 | 0.2 | 4.0 | 22.7 | 148 | 70.0 |
| 0.25 | 1.3 | 0.25 | 4.0 | 22.6 | 146 | 70.6 |
| 0.3 | 1.2 | 0.3 | 3.7 | 22.5 | 144 | 71.1 |
| 0.35 | 1.1 | 0.35 | 4.0 | 22.4 | 142 | 71.4 |
| 0.4 | 1.0 | 0.4 | 4.0 | 22.3 | 141 | 71.6 |

[a]EVA film is SG12514U38 grade, and is made from a peroxide cross-linked resin obtained from Bridgestone Corporation, Japan.
[b]F7 film sample, Table 3.

Results of similar calculations of acoustic performance for several comparative laminates are shown below in Table 8. These results show the interlayer films of the invention comprising at least 0.4 mm adhesive film layer (total EVA thickness), in combination with an effective thickness of the core film layer for security purposes, have an acceptable sharpness component (i.e., no greater than 150, the value for monolithic glass) to be an aesthetically effective acoustical barrier. Unlike the comparative glazings containing Noviflex film, these films of the invention have acceptable articulation index values in combination with acceptable sharpness values and acceptable loudness values (i.e., less than 72% A. I. and no greater than 23 sones, the values for the monolithic glass standard).

TABLE 8

| Interlayer Film Material (mm) | Glass 1 (mm) | Glass 2 (mm) | Glazing (mm) | Loudness (sones) | Sharpness | Articulation Index % |
|---|---|---|---|---|---|---|
| Noviflex/ISD1 12[a]/Noviflex (0.65/0.05/0.65) | 1.1 | 1.1 | 3.55 | >22.3 | >140 | <72.2 |
| PVB[b] (0.76) | 1.6 | 1.6 | 3.96 | 23.1 | 144 | 65.7 |
| Noviflex[c] (2.0) | 1.1 | 1.1 | 4.20 | 24.1 | 178 | 63.2 |
| No interlayer film; Tempered glass - One pane | 3.85 | — | 3.50 | 23 | 150 | 64.2 |

[a]ISD-1 12 resin film was obtained from 3M corporation, Minneapolis, MN.
[b]PVB resin was 3G grade resin obtained from Solutia, St. Louis, MO.
[c]Noviflex resin film was obtained from Sully North America, Trumbauersville, PA.

These results demonstrate the optically transparent glazings and interlayer films of the invention possess the desired combination of acoustic barrier, mechanical barrier and optical transparency needed to qualify for the most demanding standards for vehicle and architectural applications.

We claim:
1. An optically transparent glass laminate, measuring about 3 to 5 mm in total thickness, and having an interlayer film, the interlayer film comprising at least two polymeric film layers: a core film layer having a modulus of at least 25,000 psi (173 MPa), and a surface film layer having a maximum modulus of 15,000 (104 MPa) at 50 to 10,000 Hz and 20° C.; and the lass laminate having an acoustical barrier insulating capacity at least equivalent to that of a 3.85 mm thick monolithic pane of glass, an Articulation Index value of at least 64.2% at 50 to 10,000 Hz, a sharpness value of less than 150 at 50 to 10,000 Hz, a penetration resistance of at least 9 meters in test method ECE R43 A6 4.2, and a maximum haze of 4%.

2. The optically transparent glass laminate of claim 1, wherein the glass laminate comprises at least two sheets of glass and one sheet of interlayer film in a glass/interlayer film/glass sandwich having a glass/film thickness ratio from 4.2/0.8 to 1.0/2.8.

3. The optically transparent glass laminate of claim 1, wherein the interlayer film comprises one core film layer about 1.0 to 1.7 mm in thickness within two surface film layers, each about 0.2 to 0.6 mm in thickness.

4. The optically transparent glass laminate of claim 1, wherein the interlayer film comprises one core film layer about 1.0 to 1.7 mm in thickness laminated with one surface film layer about 0.4 to 1.2 mm in thickness.

5. The optically transparent glass laminate of claim 1, wherein the core film layer is a material selected from the group consisting essentially of copolymers of carboxylic acids, copolymers of acrylate esters, polycarbonate, polyethylene terephthalate, polybutylene terephthalate and polyvinylchloride, and derivatives thereof and combinations thereof.

6. The optically transparent glass laminate of claim 1, wherein the surface film layer is a material selected from the group consisting essentially of ethylene vinyl acetate, ethyl acrylic acetate, ethylene methacrylate, metallocene-catalyzed polyethylene, plasticized polyvinylchloride, plasticized polyvinylbutyral, acoustic modified acrylic resin, polyurethane and acoustic modified polyvinylchloride, and derivatives thereof and combinations thereof.

7. The optically transparent glass laminate of claim 1, wherein the glass laminate is characterized by a maximum haze of 2%.

8. The optically transparent glass laminate of claim 1, wherein the core film layer comprises an ionomeric resin and the surface film layer comprises an ethylene vinyl acetate resin.

9. The optically transparent glass laminate of claim 8, wherein the ionomeric resin and the ethylene vinyl acetate resin are each cross-linked.

10. The optically transparent glass laminate of claim 1, wherein the interlayer film further comprises at least one additive selected from the group consisting of UV modifiers, liquid elastomers, cross-linking agents and initiators, and combinations thereof.

11. The optical glass laminate of claim 1, wherein the glass laminate comprises at least two outer layers of a rigid, transparent material selected from the group consisting essentially of mineral glass, polycarbonate, polyacrylate, cyclic polyolefins and combinations thereof.

12. The optical glass laminate of claim 11, wherein the glass laminate further comprises a silane primer between the interlayer film and at least one of the outer layers of a rigid, transparent material.

13. The optically transparent glass laminate of claim 1, wherein the surface film layer is an adhesive film layer.

14. An optically transparent glass laminate having a bending stiffness of at least 0.01 Pa*m$^3$, and comprising an interlayer film, the interlayer film comprising at least two polymeric film layers: a core film layer and a surface film layer having a maximum modulus of 15,000 (104 MPa) at 50 to 10,000 HZ and 20° C.; and the glass laminate having an acoustical barrier insulating capacity at least equivalent to that of a 3.85 mm thick monolithic pane of glass, an Articulation Index value of at least 64.2% at 50 to 10,000 Hz, a sharpness value of less than 150 at 50 to 10,000 Hz, a penetration resistance of at least 9 meters in test method ECE R43 A6 4.2, and a maximum haze of 4%.

15. The optically transparent glass laminate of claim 14, wherein the glass laminate comprises at least two sheets of glass and one sheet of interlayer film in a glass/interlayer film/glass sandwich having a glass/film thickness ratio from 4.2/0.8 to 1.0/2.8.

16. The optically transparent glass laminate of claim 14, wherein the core film layer is a material selected from the group consisting essentially of copolymers of carboxylic acids, copolymers of acrylate esters, polycarbonate, polyethylene terephthalate, polybutylene terephthalate and polyvinylchloride, and derivatives thereof and combinations thereof.

17. The optical glass laminate of claim 14, wherein the glass laminate comprises at least two outer layers of a rigid, transparent material selected from the group consisting essentially of mineral glass, polycarbonate, polyacrylate, cyclic polyolefins and combinations thereof.

18. An optically transparent glass laminate comprising an interlayer film, the interlayer film having a tan delta value in the range of 0.1 to 0.6 and comprising at least two polymeric film layers: a core film layer having a modulus of at least 25,000 psi (173 MPa) and a surface film layer having a maximum tan delta value of 0.6, at 50 to 10,000 Hz and 20° C.; and the glass laminate having an acoustical barrier insulating capacity at least equivalent to that of a 3.85 mm thick monolithic pane of glass, an Articulation Index value of at least 64.2% at 50 to 10,000 Hz, a sharpness value of less than 150 at 50 to 10,000 Hz, a penetration resistance of at least 9 meters in test method ECE R43 A6 4.2, and a maximum haze of 4%.

19. The optically transparent glass laminate of claim 18, wherein the glass laminate comprises at least two sheets of glass and one sheet of interlayer film in a glass/interlayer film/glass sandwich having a glass/film thickness ratio from 4.2/0.8 to 1.0/2.8.

20. The optically transparent glass laminate of claim 18, wherein the surface film layer is a material selected from the group consisting essentially of ethylene vinyl acetate, ethyl acrylic acetate, ethylene methacrylate, metallocene-catalyzed polyethylene, plasticized polyvinylchloride, plasticized polyvinylbutyral, acoustic modified acrylic resin, polyurethane and acoustic modified polyvinylchloride, and derivatives thereof and combinations thereof.

21. The optical glass laminate of claim 18, wherein the glass laminate comprises at least two outer layers of a rigid, transparent material selected from the group consisting essentially of mineral glass, polycarbonate, polyacrylate, cyclic polyolefins and combinations thereof.

22. The optically transparent glass laminate of claim 18, wherein the core film layer is a material selected from the group consisting essentially of copolymers of carboxylic acids, copolymers of acrylate esters, polycarbonate, polyethylene terephthalate, polybutyl terephthalate and polyvinylchloride, and derivatives thereof and combinations thereof.

* * * * *